US007008089B1

United States Patent
McCloy et al.

(10) Patent No.: US 7,008,089 B1
(45) Date of Patent: *Mar. 7, 2006

(54) EXTERIOR REAR VIEW MIRROR HAVING A CHIN STRAP AND A REPEATER

(75) Inventors: Graham B. McCloy, Cundletown (AU); Ronald R. Raymo, Ft. Gratiot, MI (US)

(73) Assignee: Schefenacker Vision Systems USA Inc., Marysville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,105

(22) Filed: Feb. 1, 2000

(51) Int. Cl.
*B60Q 1/26* (2006.01)

(52) U.S. Cl. .................... 362/494; 362/549; 362/540; 362/647; 362/135

(58) Field of Classification Search ............ 362/494, 362/226, 135, 140, 396, 546, 549, 544, 141, 362/142, 234, 241, 245, 249, 800, 545, 547, 362/541, 540, 464, 548, 647, 640
See application file for complete search history.

(56) References Cited

U.S. PATENT DOCUMENTS

| 4,809,137 | A | * | 2/1989 | Yamada ................... 362/494 |
| 5,371,659 | A | | 12/1994 | Pastrick et al. |
| 5,497,305 | A | | 3/1996 | Pastrick et al. |
| 5,497,306 | A | | 3/1996 | Pastrick |
| 5,669,699 | A | | 9/1997 | Pastrick et al. |
| 5,669,704 | A | | 9/1997 | Pastrick |
| 5,669,705 | A | | 9/1997 | Pastrick et al. |
| 5,823,654 | A | | 10/1998 | Pastrick et al. |
| 5,863,116 | A | | 1/1999 | Pastrick et al. |
| 5,938,322 | A | * | 8/1999 | Alonzo et al. ............ 362/494 |
| 6,331,066 | B1 | * | 12/2001 | Desmond et al. .......... 362/494 |

FOREIGN PATENT DOCUMENTS

DE 3635471 A1 4/1988

\* cited by examiner

*Primary Examiner*—Thomas M. Sember
(74) *Attorney, Agent, or Firm*—Warn, Hoffmann, Miller & LaLone, P.C.

(57) ABSTRACT

An exterior rear view mirror assembly is disclosed which incorporates a bezel formed generally beneath the mirror housing. The bezel accommodates a rearward facing light source assembly to provide a rearward facing signal. The bezel may be integrally formed with rear view mirror assembly or may be a separate component attached to the rear view mirror assembly.

33 Claims, 4 Drawing Sheets

US 7,008,089 B1

EXTERIOR REAR VIEW MIRROR HAVING A CHIN STRAP AND A REPEATER

BACKGROUND AND SUMMARY OF THE INVENTION

1. Field of the Invention

The present invention relates generally to rear view mirror assemblies for motor vehicles and more particularly to exterior motor vehicle mirror assemblies which incorporate auxiliary lighting provided from a bezel section formed in a lower portion of the mirror assembly.

2. Discussion

Auxiliary warning lights have long been incorporated on the sides of motor vehicles to provide a means of communicating the intentions of the operator thereof to adjacent vehicles, such as the intention to change traffic lanes or to make a turn. Such lights are advantageous in providing notice to an adjacent vehicle that may be located in a blind spot and positioned such that the signaling vehicle's rear section is not visible to the operator of an adjacent vehicle.

While incorporation of such auxiliary warning lights is relatively easy and straightforward on work-type vehicles it becomes a somewhat more complex problem when passenger-type vehicles are involved due in part to the importance of aesthetic appearance. Other considerations which may apply to any type of vehicle include the need to position the lights so as to minimize any impact on the vision of the vehicle operator and to maximize the area to the side and rear of the vehicle from which the auxiliary lighting is visible. Additionally, because in many cases the vehicle manufacturer may want to offer the auxiliary lighting arrangement as an option on certain vehicles, it is highly desirable that the lighting system be designed to easily and conveniently integrate with the existing vehicle design so as to minimize added labor and/or costs associated with its installation.

SUMMARY OF THE INVENTION

This invention is directed to an exterior rear view mirror assembly including a housing adapted to be secured to an outer surface of a motor vehicle, the housing having a generally rearwardly facing opening. A reflective mirror is disposed within the opening, and a bezel forms a lower portion of the housing. The bezel has an opening for projecting light, and a light transmitting lens is disposed in the bezel. A light source assembly having a light source is placed within the bezel. The light source assembly generates light to provide a light signal from the light transmitting lens.

These and other advantages and features of the present invention will become readily apparent from the following detailed description, claims and drawings.

DESCRIPTION OF THE PREFERRED EMBODIMENT

Figure 1:
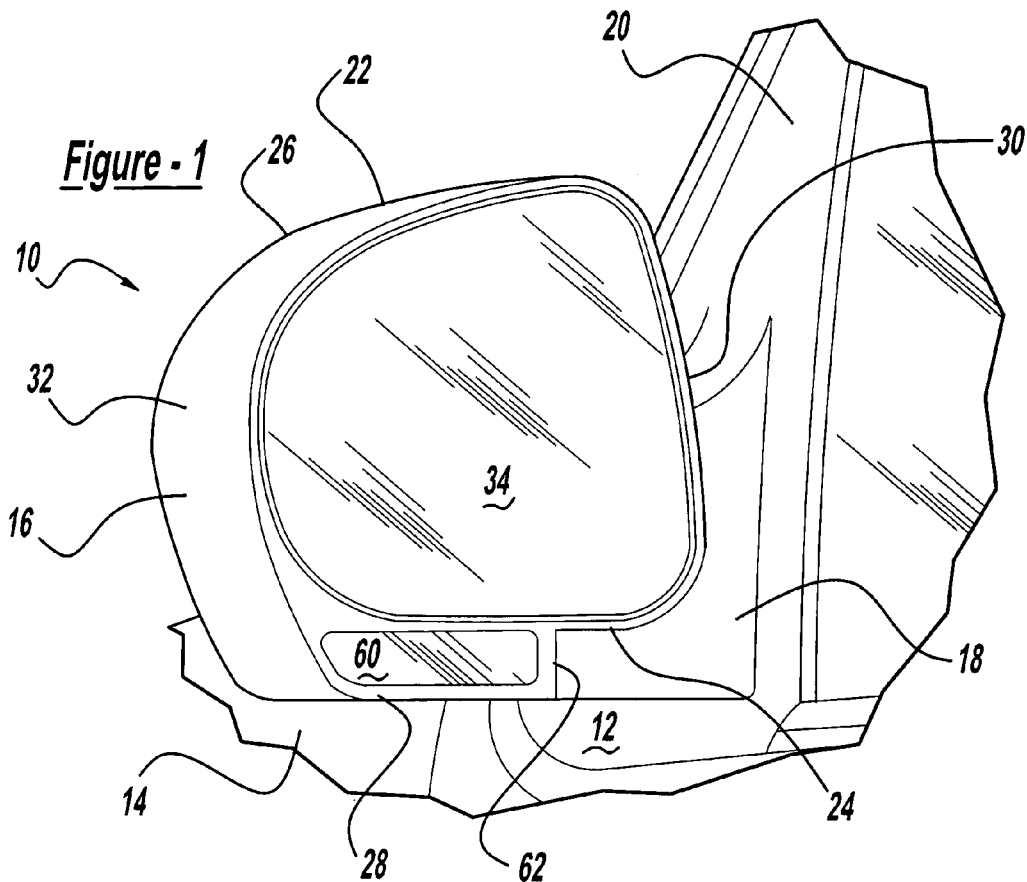
FIG. 1 is a fragmentary perspective view of a side of a motor vehicle having an exterior rear view mirror assembly incorporating an auxiliary warning light provided thereon all in accordance with the present invention.

Referring now to the drawings and in particular to FIGS. 1–4, there is shown an exterior rear view mirror assembly indicated generally at 10 installed on the door 12 of a motor vehicle 14. Mirror assembly 10 is of the typical breakaway design and includes a housing 16 pivotally supported on an arm 18 extending outwardly from a generally triangularly shaped mounting plate or sail 20. Preferably two mirror assemblies 10 will be mounted on a vehicle 14, one on each side thereof.

Figure 3:
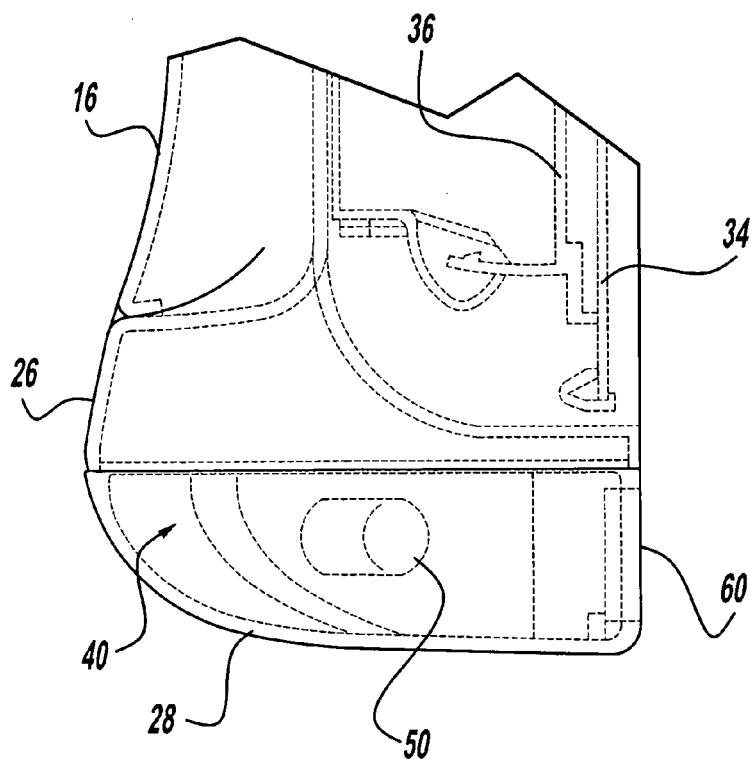
FIG. 3 is a vertical cross-sectional view of the mirror assembly of FIG. 2.

Housing 16 may be of any desired shape and includes an upper wall portion 22, a lower wall portion 24, a forwardly facing wall portion 26, a bezel section 28, and inner and outer wall portions 30 and 32 all of which merge smoothly together so as to present a pleasing appearance. The rearwardly facing portion of housing 16 is open and is adapted to receive a reflective element or mirror 34. Mirror 34 may be formed of glass or plastic and may be either of any suitable type such as flat, concave, convex, or of the type which automatically adjusts to reduce glare. A suitably shaped support member or backing 36, shown in FIG. 3, is secured within the housing 16 and serves to movably support mirror 34 within the opening. The support member 36 may include a suitable drive motor or motors 38 and the like for remote control adjustment of mirror 34 as well as means for heating the mirror if desired.

Figure 2:
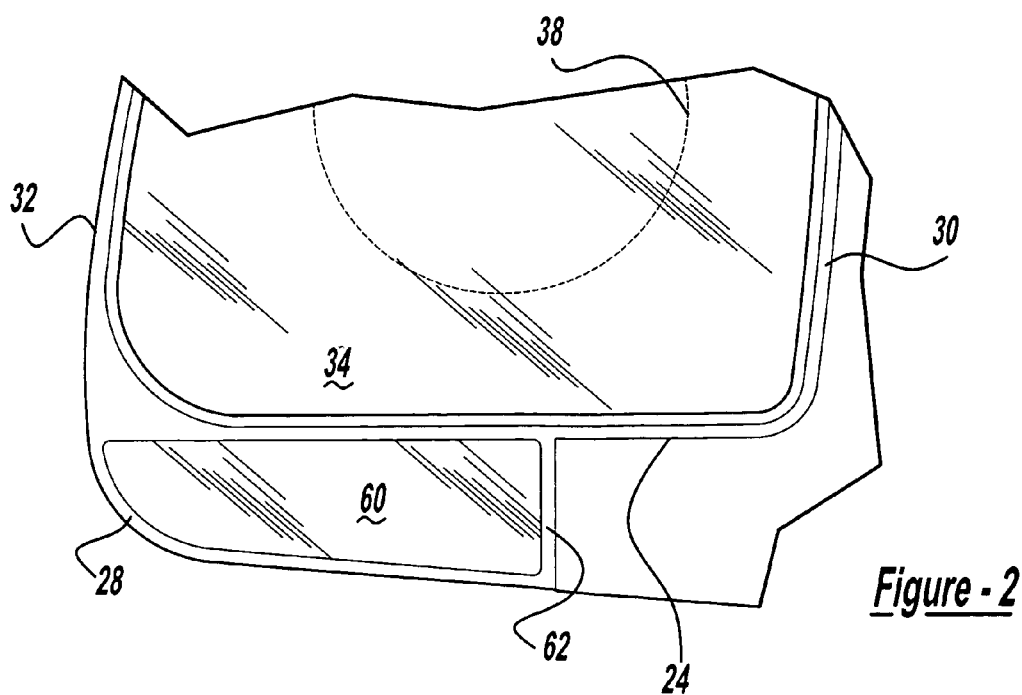
FIG. 2 is a front view of a first embodiment of the mirror assembly of FIG. 1 showing the bezel formed integrally with the mirror housing.
Figure 4:
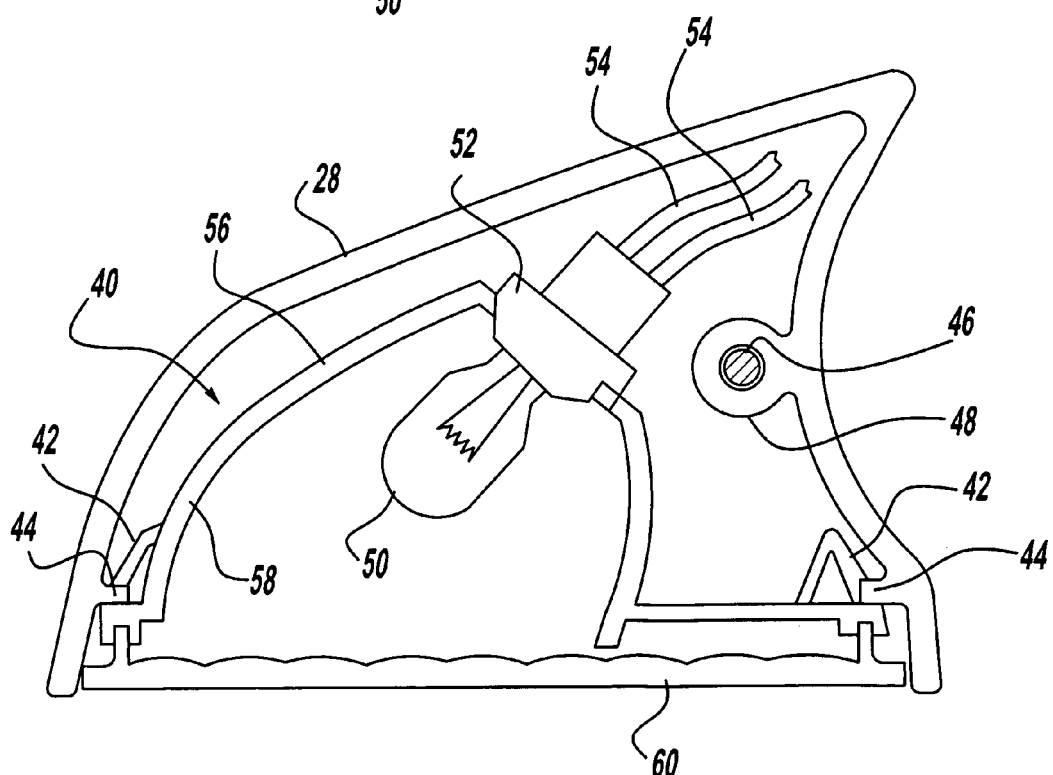
FIG. 4 is a horizontal cross-sectional view of the mirror assembly of FIG. 2.

As best seen in FIGS. 2–4, rear view mirror assembly 10 will be described as an integral unit in which housing 16 incorporates bezel 28 to form a unitary construction. Bezel 28 houses a light source assembly 40 which is inserted within bezel 28, as best seen in FIG. 4. Light source assembly 40 attaches to bezel 28 and is maintained within bezel 28 by clips 42 which engage tabs 44 formed in bezel 28. Alternatively a threaded fastener 46 can be inserted up through the bottom of the bezel through boss 48 and into a corresponding boss in housing 16.

Light source assembly 40 includes a light source 50, such as a light bulb which engages a connector 52. A pair of electrical leads 54 provide electrical power to light source 50 through connector 52. Connector 52 engages a metallized housing 56. The inner wall 58 of metallized housing 56 is preferably coated with a reflective material and shaped to direct a maximum amount of light from the light source 50 to a lens 60. The reflective coating may be colored using one of a red, amber, or white reflective coating. Lens 60 is preferably vibration welded to metallized housing 56 and is designed so as to direct light emitted from light source 50 outwardly from bezel 28 through an arc sweeping an angle 30 degrees rearward from a transverse line through 70 degrees from the transverse line. As best shown in FIGS. 1 and 2, bezel 28 extends from outer wall portion 30 of mirror assembly 10 inboard to a descending wall 62 which defines an inboard side of bezel 28. Because bezel 28 only covers a portion of the transverse section or surface of housing 16, bezel 28 does not interfere with the breakaway feature of rear view mirror assembly 10.

Figure 5:
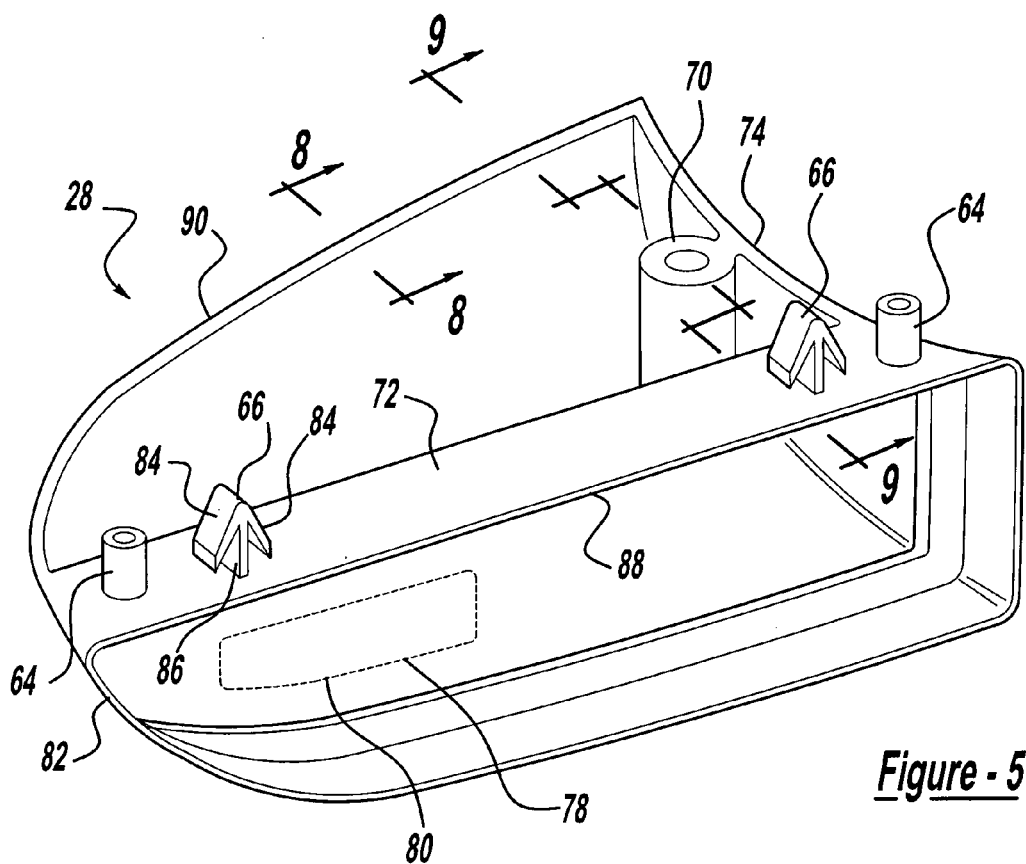
FIG. 5 is a perspective view of a second embodiment of the mirror assembly of FIG. 1 showing the bezel formed as discreet components attached to the mirror housing.
Figure 6:
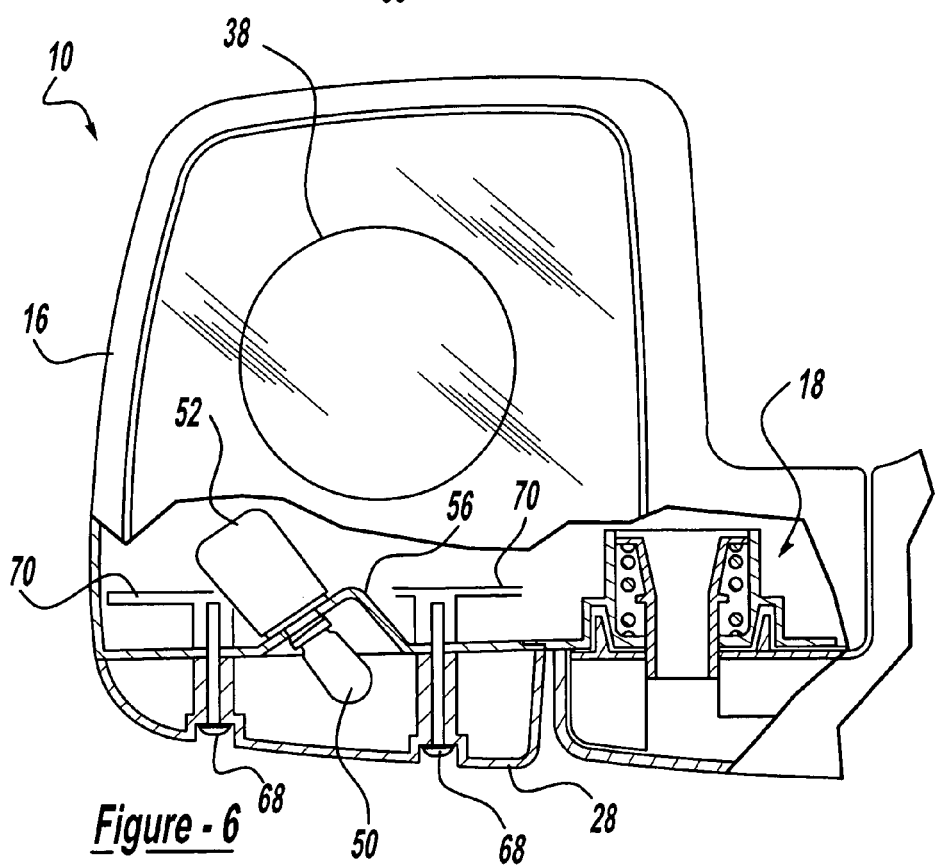
FIG. 6 is a partial cross-sectional view of the mirror housing and separate bezel component attached to the mirror housing, the section being taken along a transverse axis of the mirror assembly.

In addition to the integral bezel and housing assembly shown in FIGS. 2–4, bezel 28 may be embodied as a separate component which is then secured to housing 16, as will be described with respect to FIGS. 5–9. Like reference numerals from FIGS. 1–4 will be used to refer to similar components throughout FIGS. 5–9. FIG. 5 depicts a perspective view of bezel 28 shown when detached from housing 16. Bezel 28 is preferably contoured to provide a smooth overall appearance when interconnected with housing 16 to form rear view mirror assembly 10. However, such contour need not necessarily be smooth and may be broken or otherwise configured to meet various design criteria.

Bezel 28 interconnects to housing 16 and aligns using a pair of locators 64 formed on a longitudinal member 72. Longitudinal member 72 runs longitudinally between a rear surface 74 and a front surface 88. Longitudinal member 72 may also define an edge 84 for bezel 28. Locators 64 are generally defined as cylindrical members which project upwardly from longitudinal member 72. Locators 64 engage corresponding locating holes or apertures in housing 16 to provide positive location for bezel 28 with respect to housing 16. Bezel 28 also includes a pair of living or tree clips 66 which project upwardly from longitudinal member 72. Living clips 66 generally include a central portion 86 which projects generally vertically from longitudinal member 72. A pair of opposing flexible, opposing members 84 descend diagonally away from a top portion of central member 86. Opposing members 84 may be compressed towards central number 86 to enable insertion through an aperture. Once inserted in the aperture, opposing members 84 expand so that living clip 66 cannot be removed from the aperture without an operator displacing the opposing members toward each other. One skilled in the art will recognize that longitudinal member 72 defines one configuration for supporting locator 64 and living clips 66. Alternative configurations may include transverse members, or a plurality of longitudinal members 72.

Figure 7:
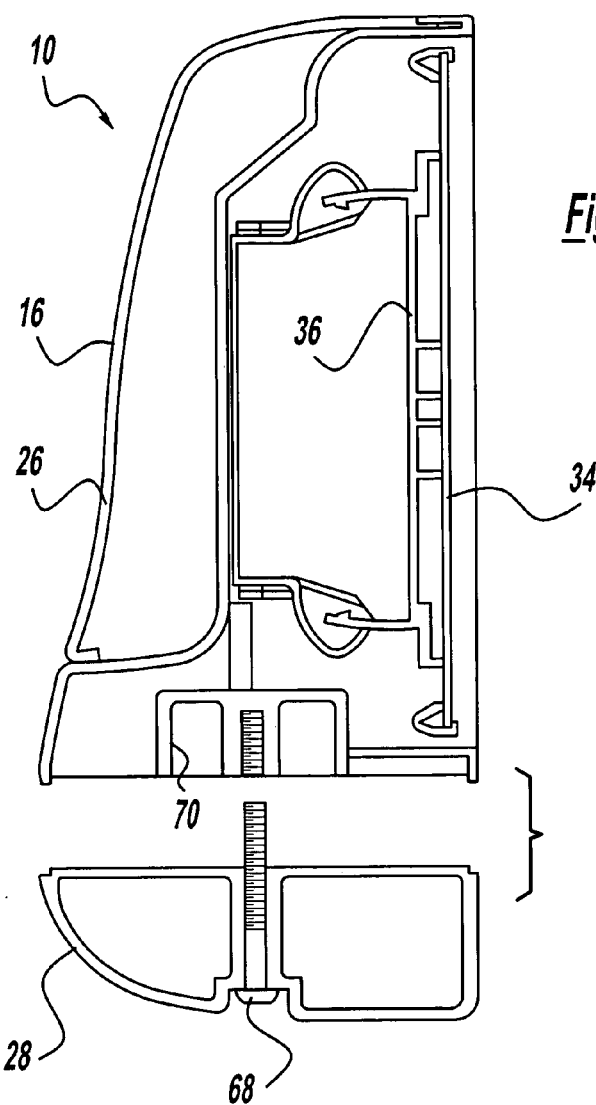
FIG. 7 is a vertical cross-sectional view of the mirror housing and separate bezel component attached to the mirror housing.

Alternatively, as shown in FIG. 7, threaded fastener 68 may be used independently or in combination with clips 66 to interconnect bezel 28 to a boss 70 formed in housing 16. In either configuration, a light source assembly 40, as described with respect to FIGS. 2–4, mounts within bezel 28 and may be generally configured as described above. Metallized housing 56 may be mounted to bezel 28 via threaded fastener 68 which engages a boss 70 formed in a bottom surface of bezel 28.

In addition to rear surface 74 and front surface 82, bezel 28 includes a side surface 90 which may be recessed from edge 88 or generally form a smooth contour with edge 88. Side surface 90 is preferably selected to provide a pleasing decorative appearance of bezel 28 and preferably is formed to accommodate light source assembly 40 in combination to provide a pleasing decorative appearance.

Figure 8:
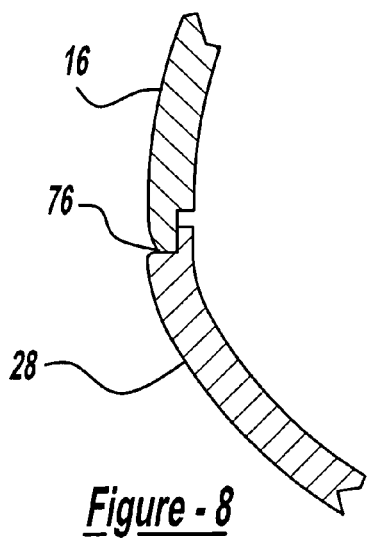
FIG. 8 is an expanded view taken along the line 8—8 of FIG. 5.
Figure 9:
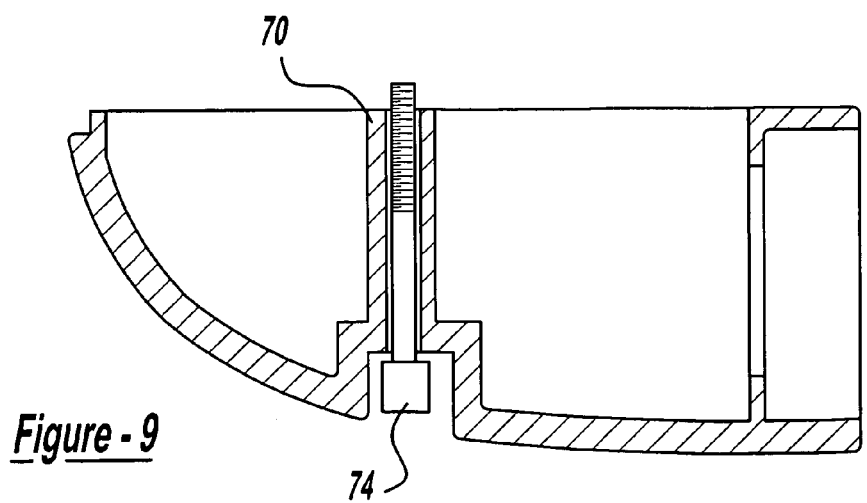
FIG. 9 is an expanded view taken along the line 9—9 of FIG. 5.

In the embodiment in FIGS. 5–9, because bezel 28 is a separate component which is attached to housing 16 to assemble into rear view mirror assembly 10, a preferably smooth interconnection between housing 16 and bezel 28 should be provided in order to minimize wind noise caused by the joint connection between bezel 28 and housing 16. FIG. 8 depicts a cross-sectional view of the interconnection between housing 16 and bezel 28. Housing 16 overlaps bezel 28 to form a joint 76 which minimizes wind noise.

Several features of rear view mirror assembly 10 are applicable to either embodiment described herein. In particular, bezel 28 is preferably configured to accommodate a repeater for a turn signal lamp. When the vehicle operator activates a turn signal, the respective left and right mirror assemblies 10 output a light signal coincident with the other vehicle turn signals. For such a configuration, the light output from lens 60 preferably is either red or amber. As an alternative to a turn signal, bezel 28 may operate in accordance with a side marker light. As a side marker, when the vehicle lights are turned on, bezel 28 preferably operates a red light to mark the sides of the vehicles. Further yet, bezel 28 can provide an approach light function to direct light generally rearwardly or downwardly with respect to rear view mirror assembly 10. As an approach light, bezel 28 preferably outputs a white light, and lens 60 is preferably smoky white. As will be understood by one skilled in the art, however, the color of the light output by bezel 28 will vary in accordance with the requirements of any safety specifications and customer requirements, and may be varied accordingly. Further, various combinations of lens colors may be used to achieve a desired color output by metallized housing 56.

Further yet, in addition to a rearward facing light as described above, an additional or alternate light output may be achieved by forming an opening 78, as best seen in FIG. 5, in bezel 28 and inserting a lens 80 therein. A similarly configured metallized housing 56 may be adapted for installation in side surface 90 of bezel 28 to provide a preferred alternate or additional light output from bezel 28. The light output from lens 80 may provide a side marker, side turn signal, reverse light, or approach light function as described above.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A mirror assembly for a vehicle comprising:
   a mirror housing;
   a reflective element;
   a backing assembly supported by the mirror housing, the backing assembly supporting the reflective element;
   a bezel having a height for extending below the housing, formed as a separate element of and attached to a lower portion of the mirror housing, a portion of the bezel including an opaque contoured surface portion extending from the lower portion of the mirror housing, the bezel having an opening for projecting light through the lens;
   a light module disposed within the bezel, the light module having a light source for providing light to be projected through the lens;
   a lens formed in the opening, the light projecting through the lens; and
   a threaded fastener that is inserted through a bottom of the bezel through a boss located in the bezel and into a corresponding boss in the mirror housing for attaching the light module to the bezel.

2. The mirror assembly of claim 1 wherein the bezel is disposed generally beneath the backing assembly and the reflective element.

3. The mirror assembly of claim 1 wherein the opening in the bezel projects rearwardly.

4. The mirror assembly of claim 1 wherein the light source generates light to provide at least one of a turn signal light, an approach light, and a vehicle side marker light.

5. An exterior rear view mirror assembly as set forth in claim 1 wherein the light source assembly has a reflective inner surface, the inner surface being shaped to direct a maximum amount of light emitted from the light source to the lens.

6. The mirror assembly of claim 1 wherein the lens is operative to direct light through an arc extending at least 40 degrees rearwardly from approximately a line passing through the mirror assembly and extending perpendicular to the longitudinal axis of the vehicle.

7. The mirror assembly of claim 1 wherein the light source is operable to provide a signal visible through the light transmitting lens to a rearward motor vehicle when actuated.

8. An exterior rear view mirror assembly comprising:
a housing adapted to be secured to an outer surface of a motor vehicle and having a generally rearwardly facing opening;
a reflective mirror disposed within the opening;
a bezel formed of a separate element of and disposed in proximity to a portion of a lower transverse surface of the housing, the bezel having a height for extending below said lower transverse surface and an opening for projecting light in a portion of said bezel formed a contoured surface from the lower portion of the mirror housing;
a light transmitting lens formed in the bezel;
a light source assembly having a light source, the light source assembly generating light projected through the opening in the bezel, the light source assembly being operable to provide a light signal visible through the light transmitting lens; and
a fastener for attaching the light source assembly to the bezel, wherein the fastener comprises either a threaded fastener that is inserted through a bottom of the bezel through a boss located in the bezel and into a corresponding boss in the mirror housing or a clip-type fastener.

9. The exterior rear view mirror assembly as set forth in claim 8 wherein the opening in the bezel projects rearwardly.

10. The exterior rear view mirror assembly as set forth in claim 9 wherein the light source assembly is removably secured to the bezel.

11. An exterior rear view mirror assembly as set forth in claim 9 wherein the bulb holder is integrally formed with the light source assembly.

12. The exterior rear view mirror assembly as set forth in claim 8 wherein the light source generates light to provide at least one of a turn signal light, a vehicle approach light, and a vehicle side marker light.

13. The exterior rear view mirror assembly as set forth in claim 8 wherein the light source generates light to provide a vehicle approach light and wherein the lens is one of red, amber, and white.

14. The exterior rear view mirror assembly as set forth in claim 8 wherein the light source generates light to provide a vehicle side marker light and wherein the lens is one of red, amber, and white.

15. The exterior rear view mirror assembly as set forth in claim 8 wherein the light source generates light to provide a turn signal and wherein the lens is one of red, white, and amber.

16. An exterior rear view mirror assembly as set forth in claim 8 wherein the light source assembly has a reflective inner surface, the inner surface being shaped to direct a maximum amount of light emitted from the light source to the lens.

17. An exterior rear view mirror assembly as set forth in claim 8 wherein the bezel is separately formed from the housing, and wherein a fastener attaches the bezel to the housing.

18. An exterior rear view mirror assembly as set forth in claim 8 wherein the lens is operative to direct light through an arc extending at least 40 degrees rearwardly from approximately a line passing through the mirror assembly and extending perpendicularly to the longitudinal axis of the vehicle.

19. An exterior rear view mirror assembly as set forth in claim 8 wherein the light source assembly includes an electrical connector for supporting the light source.

20. An exterior rear view mirror assembly as set forth in claim 8 wherein the light source assembly is operable to provide a signal visible through the light transmitting lens to a rearward motor vehicle when actuated.

21. A mirror assembly for a vehicle comprising:
a mirror housing;
a reflective element;
a backing assembly supported by the mirror housing, the backing assembly supporting the reflective element;
a bezel having a height for extending below the housing, formed as a separate element of and attached to a lower portion of the mirror housing, a portion of the bezel including an opaque portion being contoured for forming a lower contoured portion of the mirror contoured surface portion extending from the lower portion of the mirror housing, the bezel also including a cavity therein for receiving a light source and a lens over the cavity for allowing light through;
a light module disposed within the cavity, the light module having a light source for providing light to be projected through the lens for repeating of a turn signal or a stop light signal of the vehicle; and
a fastener for attaching the light module to the bezel, wherein the fastener comprises either a threaded fastener that is inserted through a bottom of the bezel through a boss located in the bezel and into a corresponding boss in the mirror housing or a clip-type fastener.

22. A mirror assembly for a vehicle comprising:
a mirror housing;
a reflective element;
a backing assembly supported by the mirror housing, the backing assembly supporting the reflective element;
an independent light emitting portion having a height for extending below the housing and contoured for forming a contoured lower surface abutting to and continuing the contour of the housing, formed as a separate element of and attached to a lower portion of the mirror housing, a portion of the light emitting portion including an opaque portion thereof for preventing light from passing therethrough and a lens portion for allowing light to project through the lens;
a light module disposed within the light emitting portion, the light module having a light source for providing light to be projected through the lens portion for signaling of a turn signal or stoplight or puddle lamp function of a vehicle; and
a fastener for attaching the light module to the light emitting portion, wherein the fastener comprises either a threaded fastener that is inserted through a bottom of the independent light emitting portion through a boss located in the independent light emitting portion and into a corresponding boss in the mirror housing or a clip-type fastener.

23. An exterior rear view mirror assembly comprising:
a housing adapted to be secured to an outer surface of a motor vehicle and having a generally rearwardly facing opening, a contoured back surface and a bottom portion;
a reflective mirror disposed within the opening;
a separately formed signal attachment disposed in proximity to a said bottom portion of the housing, the signal attachment having a height for extending below said bottom portion and an opening for projecting light in a portion of said attachment forming a contoured surface immediately adjacent and continuing the contoured surface of said contoured back surface of said housing;
a light transmitting lens formed in the said attachment;
a light source assembly having a light source, the light source assembly generating light projected through the opening in the signal attachment, the light source assembly being operable to provide a light signal visible through the light transmitting lens; and
a fastener for attaching said light source assembly to said signal attachment, wherein said fastener comprises either a threaded fastener that is inserted through a bottom of the signal attachment through a boss located in the signal attachment and into a corresponding boss in the mirror housing of a clip-type fastener.

24. A mirror assembly for a vehicle comprising:
a mirror housing;
a reflective element;
a backing assembly supported by the mirror housing, the backing assembly supporting the reflective element, said mirror housing including a downwardly extending peripheral wall having a contoured surface and a lower peripheral edge;
a signal attachment member formed independently of the mirror housing and defining a contoured option of a lower surface of the mirror housing, the signal attachment member having a height for extending below the downwardly extending peripheral wall, said signal attachment member including an upwardly extending contoured surface portion for mating with the downwardly extending wall of said mirror housing said signal attachment member including a lens portion signal attachment member being attached to said housing and forming a contour following surface from the lower peripheral edge;
a light module disposed within the signal attachment member, the light module having a light source, wherein from the source light source projects through the lens; and
a fastener for attaching said light module to said signal attachment member, wherein the fastener comprises either a threaded fastener that is inserted through a bottom of the signal attachment through a boss located in the signal attachment and into a corresponding boss in the mirror housing or a clip-type fastener.

25. A mirror assembly for a vehicle comprising:
a mirror housing including an inner wall portion, an outer wall portion and a lower wall portion extending between said inner and outer wall portions;
a reflective element;
a backing assembly supported by the mirror housing, said backing assembly supporting the reflective element;
a detachable bezel formed separately from said housing, said bezel attached to and extending below said lower wall portion, said bezel including a planar longitudinal surface extending between a front surface and a rear surface of said bezel wherein said front surface of said bezel is positioned adjacent said outer wall portion of said housing, said bezel extending inward such that said rear surface of said bezel is proximate a breakaway feature of the mirror assembly, said bezel further including a lens;
a light source emitting light within said bezel, said light projecting through said lens; and
a fastener for attaching said light source to said bezel, wherein said fastener comprises either a threaded fastener that is inserted through the bottom of a bezel through a boss located in the bezel and into a corresponding boss in the mirror housing or a clip-type fastener.

26. A mirror assembly for a vehicle comprising:
a mirror housing;
a reflective element;
a backing assembly supported by the mirror housing, the backing assembly supporting the reflective element;
said mirror housing including a downwardly extending peripheral wall;
a bezel formed independently of the mirror housing and defining a portion of a lower transverse surface of the mirror housing and defining a portion of a lower transverse surface of the mirror housing, the bezel having a height for extending below the downwardly extending peripheral wall, said bezel including an upwardly extending wall portion for mating with the downwardly extending wall of said mirror housing and having an opening for projecting light;
said bezel attached to said housing;
a light module disposed within the bezel, the light module having a light source, wherein light from the source light source projects through the opening;
a lens formed in the opening, the light projecting through the lens; and
a fastener for attaching said light module to said bezel, wherein the fastener comprises either a threaded fastener that is inserted through a bottom of the bezel through a boss located in the bezel and into a corresponding boss in the mirror housing or a clip-type fastener.

27. A mirror assembly for a vehicle comprising:
a mirror housing;
a reflective element;
a backing assembly supported by the mirror housing, the backing assembly supporting the reflective element;
a bezel having a height for extending below the housing, formed as a separate element of and attached to a lower portion of the mirror housing, a portion of the bezel including an opaque contoured surface portion extending from the lower portion of the mirror housing, the bezel having an opening for projecting light through the lens;
a light module disposed within the bezel, the light module having a light source for providing light to be projected through the lens;
a lens formed in the opening, the light projecting through the lens; and
a clip-type fastener for engaging the bezel and attaching the light module to the bezel.

28. The mirror assembly of claim 27 wherein the bezel is disposed generally beneath the backing assembly and the reflective element.

29. The mirror assembly of claim 27 wherein the opening in the bezel projects rearwardly.

30. The mirror assembly of claim 27 wherein the light source generates light to provide at least one of a turn signal light, an approach light, and a vehicle side marker light.

31. An exterior rear view mirror assembly as set forth in claim 27 wherein the light source assembly has a reflective inner surface, the inner surface being shaped to direct a maximum amount of light emitted from the light source to the lens.

32. The mirror assembly of claim 27 wherein the lens is operative to direct light through an arc extending at least 40 degrees rearwardly from approximately a line passing through the mirror assembly and extending perpendicular to the longitudinal axis of the vehicle.

33. The mirror assembly of claim 27 wherein the light source is operable to provide a signal visible through the light transmitting lens to a rearward motor vehicle when actuated.

* * * * *